(12) United States Patent
Weckesser

(10) Patent No.: US 10,258,951 B2
(45) Date of Patent: Apr. 16, 2019

(54) REACTOR AND PROCESS FOR PREPARING GRANULAR POLYSILICON

(71) Applicant: Wacker Chemie AG, Munich (DE)

(72) Inventor: Dirk Weckesser, Mehring (DE)

(73) Assignee: WACKER CHEMIE AG, Munich (DE)

(*) Notice: Subject to any disclaimer, the term of this patent is extended or adjusted under 35 U.S.C. 154(b) by 389 days.

(21) Appl. No.: 15/126,921

(22) PCT Filed: Mar. 12, 2015

(86) PCT No.: PCT/EP2015/055143
§ 371 (c)(1),
(2) Date: Sep. 16, 2016

(87) PCT Pub. No.: WO2015/140028
PCT Pub. Date: Sep. 24, 2015

(65) Prior Publication Data
US 2017/0120210 A1 May 4, 2017

(30) Foreign Application Priority Data
Mar. 18, 2014 (DE) .................. 10 2014 205 025

(51) Int. Cl.
*C01B 33/027* (2006.01)
*B01J 8/18* (2006.01)
*B01J 8/42* (2006.01)

(52) U.S. Cl.
CPC .............. *B01J 8/1836* (2013.01); *B01J 8/42* (2013.01); *C01B 33/027* (2013.01); *B01J 2208/00415* (2013.01); *B01J 2208/00902* (2013.01)

(58) Field of Classification Search
CPC .... B01J 2208/00389; B01J 2208/00407; B01J 2208/00415; B01J 2219/00132;
(Continued)

(56) References Cited

U.S. PATENT DOCUMENTS 4,643,890 A * 2/1987 Schramm .............. C30B 25/005
373/155
4,786,477 A 11/1988 Yoon et al.
(Continued)

FOREIGN PATENT DOCUMENTS

CN 101258105 A 9/2008
WO 93/20933 A1 10/1993
(Continued)

*Primary Examiner* — Melvin C. Mayes
*Assistant Examiner* — Smita S Patel
(74) *Attorney, Agent, or Firm* — Brooks Kushman P.C.

(57) ABSTRACT

A reactor for preparing granular polysilicon by deposition of polycrystalline silicon on silicon seed particles has a reaction vessel, an inner reactor tube for a fluidized bed comprising granular polysilicon and a reactor bottom within the reactor vessel, a heating device for heating the fluidized bed in the inner reactor tube, at least one bottom gas nozzle for introduction of fluidizing gas and at least one reaction gas nozzle for introduction of reaction gas, a feed device to introduce silicon seed particles, an offtake line for granular polysilicon, and a device for discharging reactor offgas from the reactor vessel, and has a cylindrical component which has openings on its cylindrical surface, with at least 5% and not more than 95% of the cylindrical surface being open located between the inner reactor tube and the heating device.

7 Claims, 3 Drawing Sheets

(58) Field of Classification Search
CPC .... B01J 2219/00135; B01J 2208/00902; B01J 8/1836; B01J 8/42; B01J 8/18; C01B 33/00; C01B 33/027
USPC ........ 219/284, 421, 261, 139, 142, 59.1, 50, 219/101, 607
See application file for complete search history.

(56) References Cited

U.S. PATENT DOCUMENTS

| | | | |
|---|---|---|---|
| 5,260,538 | A | 11/1993 | Clary et al. |
| 5,382,412 | A | 1/1995 | Kim et al. |
| 5,770,154 | A * | 6/1998 | Bigeard ................ B01J 8/0285 422/109 |
| 7,029,632 | B1 | 4/2006 | Weidhaus et al. |
| 8,017,024 | B2 | 9/2011 | Kim et al. |
| 2008/0241046 | A1 | 10/2008 | Hertlein et al. |
| 2009/0047204 | A1 * | 2/2009 | Kim ..................... C01B 33/027 423/349 |
| 2012/0328503 | A1 * | 12/2012 | Fahrenbruck ....... C01B 33/1071 423/342 |

FOREIGN PATENT DOCUMENTS

| | | | |
|---|---|---|---|
| WO | 2007/130613 | A2 | 11/2007 |
| WO | 2008/018760 | A1 | 2/2008 |

\* cited by examiner

REACTOR AND PROCESS FOR PREPARING GRANULAR POLYSILICON

CROSS REFERENCE TO RELATED APPLICATIONS

This application is the U.S. National Phase of PCT Appln. No. PCT/EP2015/055143 filed Mar. 12, 2015, which claims priority to German Application No. 10 2014 205 025.1 filed Mar. 18, 2014, the disclosures of which are incorporated in their entirety by reference herein.

BACKGROUND OF THE INVENTION

1. Field of the Invention

The invention relates to a reactor, in particular a fluidized-bed reactor, and a process for preparing granular polysilicon.

2. Description of the Related Art

Fluidized-bed reactors are used, for example for preparing trichlorosilane (TCS) by reaction of metallurgical silicon with HCl at 350-400° C. TCS can likewise be produced from metallurgical silicon and STC/$H_2$ (STC=silicon tetrachloride) in a fluidized-bed reactor.

Fluidized-bed reactors are also used for preparing polycrystalline silicon granules.

This is achieved by fluidization of silicon particles by means of a gas stream in a fluidized bed, with the bed being heated to high temperatures by means of a heating device. Introduction of a silicon-containing reaction gas results in a pyrolysis reaction on the hot particle surface. Here, elemental silicon deposits on the silicon particles and the diameter of the individual particles increases. Taking off particles which have increased in size at regular intervals and adding smaller silicon particles as seed particles enables the process to be operated continuously with all attendant advantages. Silicon-halogen compounds (e.g. chlorosilanes or bromosilanes), monosilane ($SiH_4$), and mixtures of these gases with hydrogen have been described as silicon-containing feed gas. Such deposition processes and apparatuses for carrying them out are known, for example, from U.S. Pat. No. 4,786,477 A.

U.S. Pat. No. 5,382,412 A discloses a process for preparing polycrystalline silicon in a fluidized-bed reactor, in which silicon starting particles are fed into the reactor in order to form a bed of silicon particles; the reactor bed is divided into a reaction zone in which a gaseous or vaporized silicon source is deposited as silicon metal on the silicon particles at a reaction temperature, and a heating zone in which a fraction of the silicon particles is heated to above the reaction temperature; a reaction gas which comprises the silicon source is introduced into the reaction zone, as a result of which the silicon particles in the reaction zone are fluidized; a carrier gas is introduced into the heating zone, as a result of which the silicon particles in the heating zone are fluidized; the silicon particles in the heating zone are heated by introduction of microwave energy into the heating zone; the silicon particles in an upper region of the heating zone are mixed with silicon particles of the reaction zone, as a result of which heat is transferred from the heating zone into the reaction zone; and unreactive fluidizing gas and reaction by-product gases are removed from the reactor.

However, owing to the temperature-dependent injection behavior of microwaves into silicon and the dependence of the energy input on the geometry of the reactor and the microwave supply, energy introduction which is nonuniform over the area occurs when using such a reactor. Substantial overheating of individual silicon particles and sintering together of particles and also formation of relatively large particle agglomerates takes place in the fluidized bed. These silicon agglomerates are undesirable in the product and, owing to their poorer flow properties, interfere substantially with reactor operation. Likewise, particles adhere to the fluidized-bed wall and are sometimes heated to melting (T>1400° C.). The substantial overheating of particles in the direct vicinity of the waveguide connections also led to excessive thermal stressing of the fluidized-bed wall. Although the fluidization of the fluidized bed and thus the mixing behavior has an equalizing effect with respect to the temperature distribution in the fluidized bed, this is greatly dependent on the degree of fluidization. The higher the gas velocity, the greater the extent to which particles are mixed vertically and horizontally. However, an increase in the gas velocity to far above the loosening velocity always results in an increase in the energy input required since the fluidizing gas generally flows into the fluidized bed with a significantly lower temperature than the particles and heats up approximately to the temperature of the particles during flow through the fluidized bed.

U.S. Pat. No. 7,029,632 B2 discloses a fluidized-bed reactor having a pressure-rated shell, an inner reactor tube which transmits heat radiation, an inlet for silicon particles, a tubular inlet for introduction of a reaction gas which divides the fluidized bed into a heating zone and a reaction zone located above the heating zone, a gas distribution device for introduction of a fluidizing gas into the heating zone, an outlet for unreacted reaction gas, fluidizing gas and the gaseous or vaporized product of the reaction, an outlet for the product, a heating device and also an energy supply for the heating device, with it being proposed that the heating device is a radiation source for radiation of heat which is arranged in an annular fashion around the heating zone outside the inner reactor tube and without direct contact with the latter and is configured in such a way that it heats the silicon particles in the heating zone by means of heat radiation to such a temperature that the reaction temperature is established in the reaction zone. Here too, the heating zone and reaction zone are separated vertically. This makes it possible to heat the fluidized bed by heating methods other than microwaves since no deposition on the wall can occur in the heating zone because there is no silicon-containing gas present there. Heat radiation heating by means of flat heating elements is provided, and introduces the heat uniformly over the circumference of the fluidized bed and in a positionally defined manner.

The main part of the heat radiation penetrates the inner reactor tube which has a high transmission for the heat radiation emitted by the selected heater and is absorbed directly by the silicon particles which are in the direct vicinity of the wall in the heating zone. Thus, the silicon particles in the fluidized bed can be directly heated uniformly over the circumference of the heating zone. Only a small proportion of the heat radiation is absorbed by the reactor tube and heats the latter.

The heating device is, for example, made up of heating elements composed of doped silicon or graphite or silicon carbide, fused silica tube radiators, ceramic radiators or metal wire radiators. The heating device is most preferably a meandering slotted tube composed of graphite with an SiC surface coating, which is arranged standing or suspended on the electrode connections in the reactor.

Cooling the interior of the reactor after the deposition is complete and flushing it with an inert gas such as $H_2$, $N_2$, Ar, He or a mixture of these gases is known from U.S. Pat. No. 8,017,024 B2. The cooled silicon particles are subsequently taken out, the reactor is disassembled, the reactor tube is replaced by a new tube, the reactor is assembled again and silicon particles are introduced into the reactor tube. The silicon particles are subsequently heated up and a fresh deposition operation commences.

The reactors described in the prior art have the problem that the reactor tube, which usually consists of fused silica, is destroyed when taken out from the reactor. This can result in contamination of the granular polysilicon. According to U.S. Pat. No. 8,017,024 B2, this can be prevented by dispensing with the disassembly of the reactor and passing a corroding gas into the reactor in order to remove the wall deposit from the reactor tube, with the polysilicon granules being taken from the reactor before the corroding treatment.

WO 2008/018760 A1 discloses protective tubes for heating devices in a fluidized-bed reactor, where the heating devices are located within the protective tube. The protective tubes serve to prevent or minimize contamination of silicon particles by the heating devices.

WO 93/20933 A1 describes a susceptor which is installed between the reactor well and an inductor. The reactor wall is heated by radiation heating. The susceptor is electrically conductive and is heated by induction. In this way, a uniform temperature distribution of the reactor wall can be achieved. The susceptor consists of high-temperature-resistant, thermally conductive material, preferably of graphite. However, this susceptor acts as a radiation shield and makes the process uneconomical.

The objects of the invention were derived from these problems.

SUMMARY OF THE INVENTION

The objects of the invention are achieved by a reactor for preparing granular polysilicon by deposition of polycrystalline silicon on silicon seed particles, which comprises a reaction vessel, an inner reactor tube for a fluidized bed comprising granular polysilicon, and a reactor bottom within the reactor vessel, a heating device for heating the fluidized bed in the inner reactor tube, at least one bottom gas nozzle for introduction of fluidizing gas and at least one reaction gas nozzle for introduction of reaction gas, a feed device to introduce silicon seed particles and also an offtake line for granular polysilicon, and a device for discharging reactor offgas from the reactor vessel, wherein a cylindrical component which has openings on its cylindrical surface, with at least 5% and not more than 95% of the cylindrical surface being open, is located between inner reactor tube and heating device.

DETAILED DESCRIPTION OF THE PREFERRED EMBODIMENTS

Figure 1:
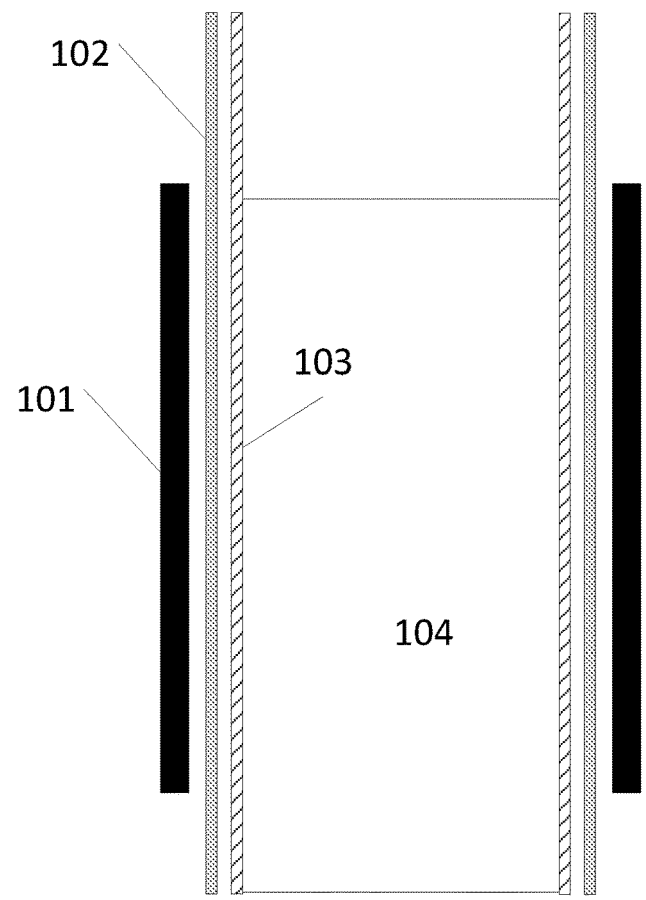
FIG. 1 schematically shows, in two views, how the component is arranged between heaters and reactor tube.
Figure 1:
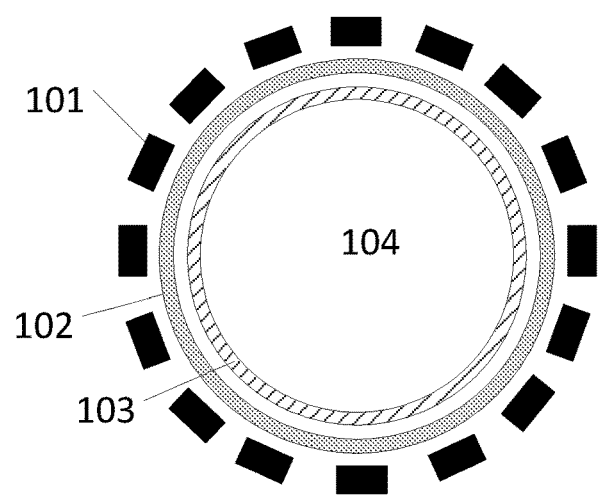

For the purposes of the present invention, the feature that at least 5% and not more than 95% of the cylindrical surface of the cylindrical component is open means that the ratio of free area (sum of the open areas) to the total area of the cylindrical surface of the component is 5-95%. This ratio is preferably 40-70%, more preferably 45-60%. The openings can be slits, cut-outs, meshes, drilled holes, etc. The component can, for example, have the form of a cylindrical mesh.

The component is preferably open in the upward or downward direction or in both directions (base and top area of the cylinder). This facilitates the disassembly of the reactor.

The heating device can be a heater having a meandering shape or a plurality of heating elements or heating strips. The heating device preferably consists of a plurality of heating elements arranged concentrically around the inner reactor tube. In this case, the component, which is likewise arranged concentrically around the inner reactor tube, is preferably located between the heating elements and the inner reactor tube.

The component preferably consists of a material which has good thermal conductivity. The heating energy is transferred by heat radiation and heat conduction to the component and brings the latter to glowing. Preference is also given to using a component which consists of a material which is permeable for the radiation energy from the heating device. The heating elements are preferably located in openings of the cylindrical surface of the component. The openings can be cut-outs in which the heating strips are located.

The component preferably comprises a material selected from the group consisting of graphite, CFC, silicon, SiC and fused silica. The component can consist of one or more of the materials mentioned. The component can likewise be coated with one or more of the materials mentioned.

The fluidized-bed reactor consists of a reactor vessel in which an inner reactor tube is installed. The fluidized bed comprising the polysilicon granules is present in the interior of the reactor tube. The fluidized bed is heated by means of the heating device. As feed gases, the fluidizing gas and the reaction gas mixture are fed into the reactor. The gases are fed in a targeted manner through nozzles. The fluidizing gas is fed in via a bottom gas nozzle and the reaction gas mixture is fed in through secondary gas nozzles (reaction gas nozzles). The height of the secondary gas nozzles can differ from the height of the bottom gas nozzles. Due to the arrangement of the nozzles, a bubble-forming fluidized bed with additional vertical secondary gas introduction is formed in the reactor. Silicon seed particles are introduced into the reactor via a feed device. The polysilicon granule product is taken off through an offtake line at the bottom of the reactor. The reactor offgas is taken off via a facility for discharging reactor offgas.

It has surprisingly been found that the use of a component as mentioned above between heating device and reactor tube is not only suitable for equalizing the temperature but also for protecting the heating device during drawing-out of the reactor.

In the prior art, damage to the heating elements occurred as a result of the breaking-up of the reactor tube. This can be avoided by means of the present invention. The component is insensitive to breaking parts of the reactor tube and can be reused.

In addition, unlike the prior art, no radiation shield is present since the component has openings and energy input into the fluidized bed thus occurs in a more economical way.

The invention is illustrated below with the aid of figures.

LIST OF REFERENCE NUMERALS USED

101 Heater
102 Component

103 Inner reactor tube
104 Fluidized bed

Fluidized bed 104 is located in the inner reactor tube 103. The component 102 is located between heater 101 and inner reactor tube 103. Heater 101 and component 102 are arranged concentrically around the inner reactor tube 103.

Figure 2:
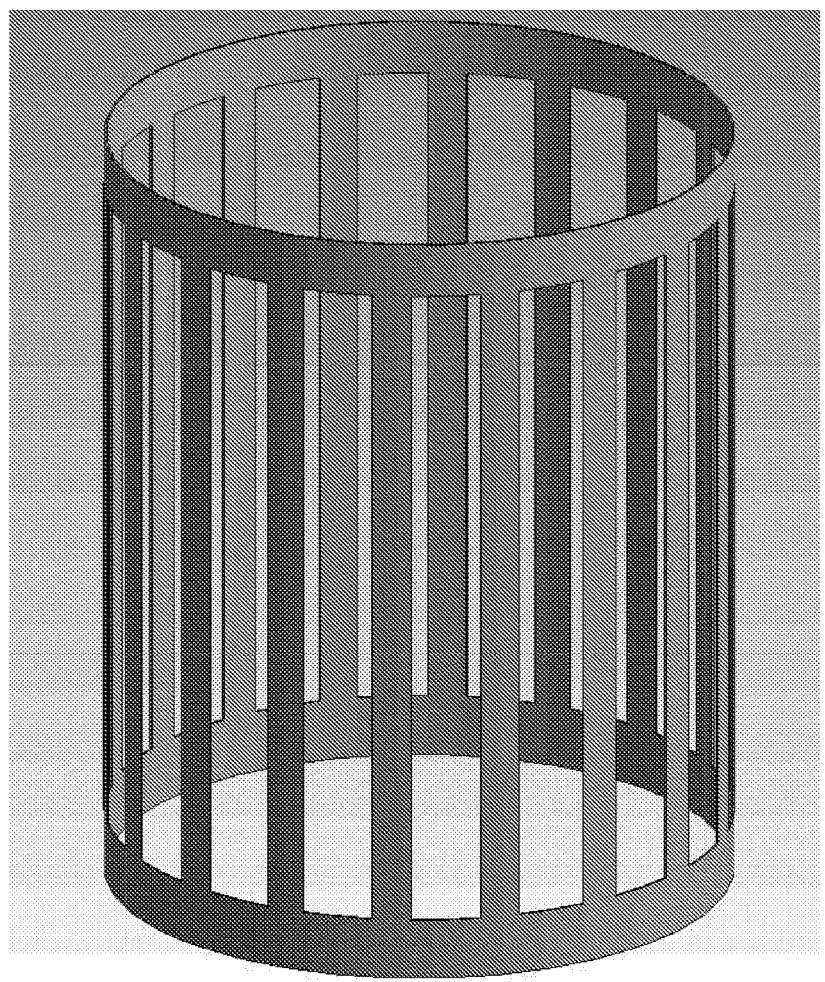
FIG. 2 shows a first embodiment of the component.
Figure 3:
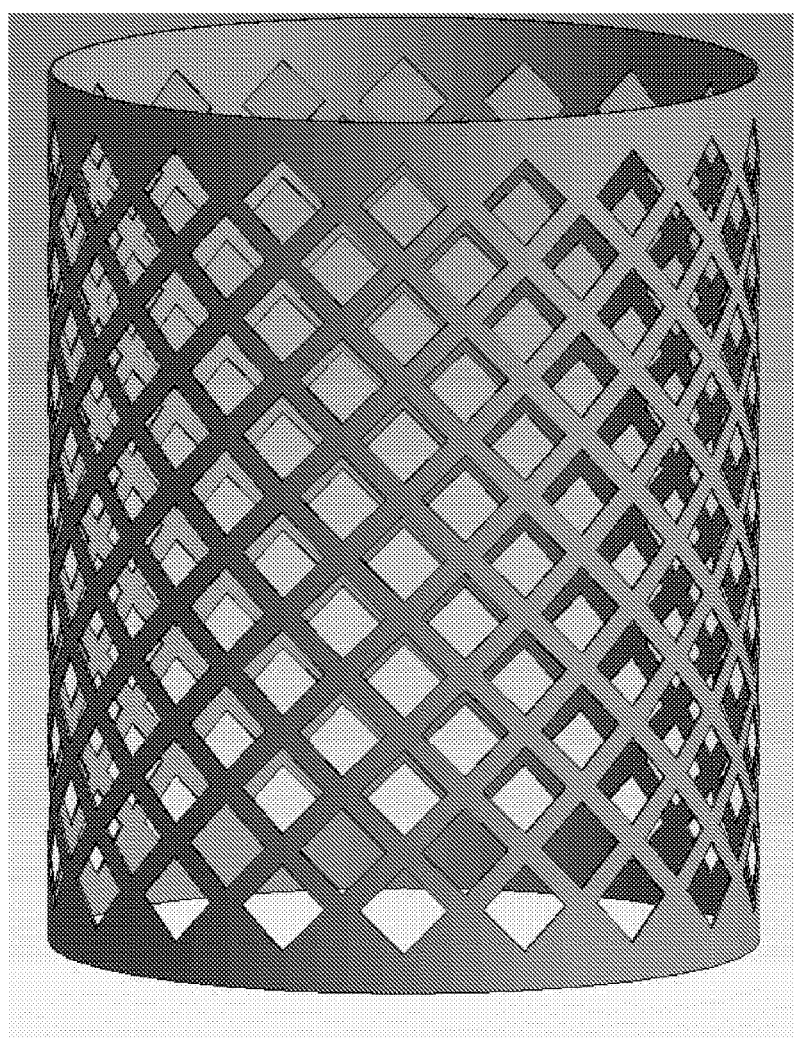
FIG. 3 shows a second embodiment of the component.

FIGS. 2 and 3 show two embodiments of components which can be used; however, these are not intended to restrict the general inventive concept in any way.

FIG. 2 shows a component in which 55% of the cylindrical surface is open. The openings have a rectangular shape (slits in the longitudinal direction of the cylinder) and are uniformly distributed over the cylindrical surface of the cylindrical component. This embodiment is particularly useful for arranging heating elements in the openings.

FIG. 3 shows a component in which 47% of the cylindrical surface is open. A plurality of square openings are present on the cylindrical surface of the cylindrical component.

The invention also provides a process for preparing granular polysilicon using a reactor according to the invention, which comprises fluidization of silicon seed particles by means of a gas stream in a fluidized bed which is heated by means of a heating device, with polycrystalline silicon being deposited on the hot seed particle surfaces by introduction of a silicon-containing reaction gas by means of pyrolysis thereof so as to form the granular polysilicon.

The process is preferably operated continuously by discharging particles whose diameter has been increased by deposition from the reactor and fresh seed particles being introduced.

The temperature of the fluidized bed in the reaction region is preferably 850-1100° C., more preferably 900-1050° C., and most preferably 920-970° C.

The fluidizing gas is preferably hydrogen. The reaction gas is injected into the fluidized bed through one or more nozzles. The local gas velocities at the outlet of the nozzles are preferably from 0.5 to 200 m/s.

The concentration of the silicon-containing reaction gas is preferably from 10 mol % to 50 mol %, more preferably from 15 mol % to 40 mol %, based on the total amount of gas flowing through the fluidized bed.

The concentration of the silicon-reaction gas in the reaction gas nozzles is preferably from 20 mol % to 80 mol %, particularly preferably from 30 mol % to 60 mol %, based on the total amount of gas flowing through the reaction gas nozzles. Trichlorosilane is preferably used as silicon-containing reaction gas.

The reactor pressure is in the range from 0 to 7 bar gauge, preferably in the range from 0.5 to 4.5 bar gauge.

In the case of a reactor having a diameter of, for example, 400 mm, the mass flow of trichlorosilane is preferably from 200 to 400 kg/h. The volume flow of hydrogen is preferably from 100 to 300 standard m$^3$/h. For larger reactors, greater amounts of TCS and H$_2$ are preferred.

It will be clear to a person skilled in the art that some process parameters are ideally selected as a function of the reactor size. Reactor heating power, rate of introduction of seed particles and the bed weight are preferably higher than the abovementioned values in the case of relatively large reactors, e.g. in the case of a reactor having a diameter of 800 mm.

To demonstrate this clearly, the ranges of the operating data normalized to the reactor cross-sectional area in which the process described in the context of the present invention is applicable are shown below.

The specific mass flow of trichlorosilane is preferably 1600-5500 kg/(h*m$^2$).

The specific volume flow of hydrogen is preferably 800-4000 standard m$^3$/(h*m$^2$).

The specific bed weight is preferably 800-2000 kg/m$^2$.

The specific rate of introduction of seed particles is preferably 8-25 kg/(h*m$^2$).

The specific reactor heating power is preferably 800-3000 kW/m$^2$.

The average diameter of the silicon particles (seed particles) is preferably at least 400 μm.

The granular polysilicon preferably has particle sizes of 150-10,000 μm, with a mass-based median value of a particle size distribution being 850-2000 μm.

The residence time of the reaction gas in the fluidized bed is preferably from 0.1 to 10 s, more preferably from 0.2 to 5 s.

The invention claimed is:

1. A reactor for preparing granular polysilicon by deposition of polycrystalline silicon on silicon seed particles, comprising:
a reaction vessel having a reactor bottom; an inner reactor tube for a fluidized bed comprising granular polysilicon, a heater for heating the fluidized bed in the inner reactor tube; at least one bottom gas nozzle for introduction of fluidizing gas and at least one reaction gas nozzle for introduction of reaction gas; a silicon seed particle feed; an offtake line for granular polysilicon; a reactor offgas discharge for discharging reactor offgas from the reactor vessel; and a cylindrical component which has openings on its cylindrical surface such that at least 5% and not more than 95% of the cylindrical surface is open, the cylindrical component located between the inner reactor tube and the heater, and comprising a thermally conductive material such that heat energy is transferred by heat radiation and heat conduction to the cylindrical component such the cylindrical component can be brought to incandescence, or wherein the component comprises a material which is permeable to radiation energy from the heater.

2. The reactor of claim 1, wherein 40-70% of the cylindrical surface of the component is open.

3. The reactor of claim 2, wherein 45-60% of the cylindrical surface of the component is open.

4. The reactor of claim 1, wherein the heater comprises a resistance heater having a meandering shape or comprises a plurality of individual heating elements.

5. The reactor of claim 1, wherein the heater comprises a plurality of heating elements arranged concentrically around the inner reactor tube and the cylindrical component is also arranged concentrically around the inner reactor tube and within the heater.

6. The reactor of claim 1, wherein the heater comprises heating elements which are positioned in openings of the cylindrical component.

7. The reactor of claim 1, wherein the cylindrical component is constructed of at least one material selected from the group consisting of graphite, CFC, silicon, SiC and fused silica, or wherein the cylindrical component is coated with one or more of these materials.

* * * * *

UNITED STATES PATENT AND TRADEMARK OFFICE
CERTIFICATE OF CORRECTION

PATENT NO. : 10,258,951 B2  
APPLICATION NO. : 15/126921  
DATED : April 16, 2019  
INVENTOR(S) : Dirk Weckesser Page 1 of 1

It is certified that error appears in the above-identified patent and that said Letters Patent is hereby corrected as shown below:

In the Claims

Column 6, Line 40, Claim 1:  
After "cylindrical component such"  
Insert -- that --.

Signed and Sealed this  
Thirteenth Day of August, 2019

Andrei Iancu  
*Director of the United States Patent and Trademark Office*